United States Patent [19]

Arai et al.

[11] Patent Number: 4,788,736
[45] Date of Patent: Dec. 6, 1988

[54] YOKE MEMBER CONNECTING DEVICE IN WINDSHIELD WIPER

[75] Inventors: Masaru Arai; Itsuro Saita, both of Saitama, Japan

[73] Assignee: Nippon Wiper Blade Co., Ltd., Saitama, Japan

[21] Appl. No.: 150,430

[22] PCT Filed: Jun. 25, 1987

[86] PCT No.: PCT/JP87/00423
§ 371 Date: Jan. 22, 1988
§ 102(e) Date: Jan. 22, 1988

[87] PCT Pub. No.: WO88/00147
PCT Pub. Date: Jan. 14, 1988

[30] Foreign Application Priority Data

Jun. 30, 1986 [JP] Japan .................. 61-99928[U]

[51] Int. Cl.$^4$ .................................................. B60S 1/38
[52] U.S. Cl. ................................ 15/250.42; 15/250.32; 403/155
[58] Field of Search ................ 15/250.31–250.42; 403/154, 155

[56] References Cited

U.S. PATENT DOCUMENTS

| 2,876,482 | 3/1959 | Oishei | 15/250.42 |
| 3,585,672 | 6/1971 | Habert | 15/250.42 |
| 3,864,783 | 2/1975 | Arman | 15/250.42 |
| 4,675,934 | 6/1987 | Dal Palù | 15/250.42 |

FOREIGN PATENT DOCUMENTS 2038167 7/1980 United Kingdom.

Primary Examiner—Peter Feldman
Attorney, Agent, or Firm—Wenderoth, Lind & Ponack

[57] ABSTRACT

A yoke member connecting device for use in a windshield wiper, which device pivotally connects a first and a second yoke members of the windshield wiper through a pivot pin. The first and second yoke members respectively have spaced side walls having aligned openings for passing through the pivot pin, and there is provided a spacer member having side walls interposed respectively between side walls of the first and second yoke members. At least one side wall of the spacer member has a small diameter bore corresponding to an intermediate small diameter portion of the pivot pin, a first cutout extending in a first direction from the bore, and a second cutout spaced from the first cutout in a second direction which is perpendicular to the first direction and extending parallel to the first cutout.

7 Claims, 3 Drawing Sheets

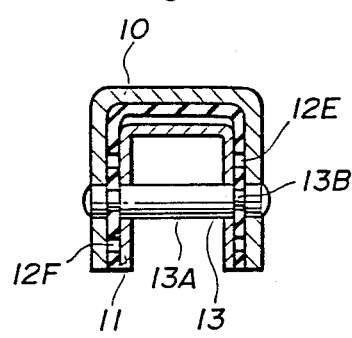
Fig. 1
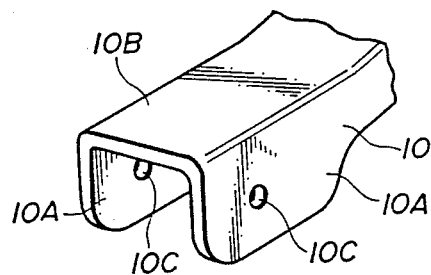
Fig. 2
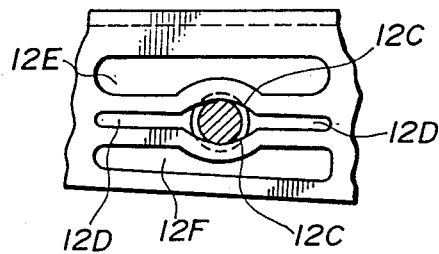
Fig. 3
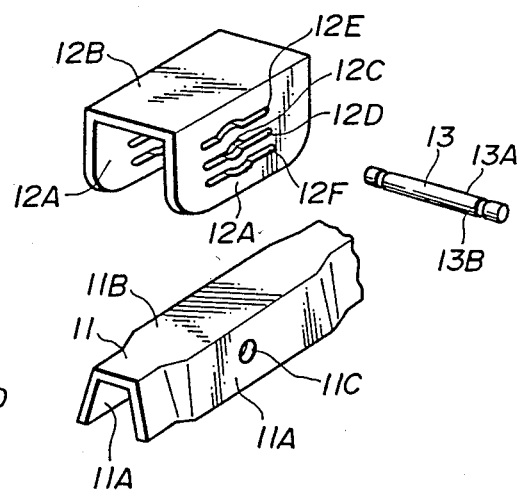

Fig. 8
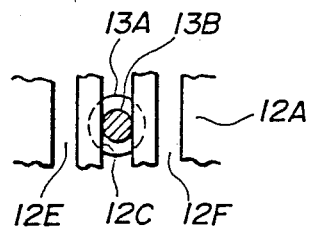
Fig. 9   Fig. 10   Fig. 11
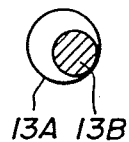 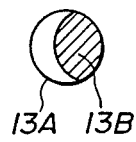 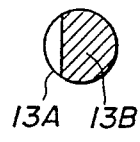
Fig. 12
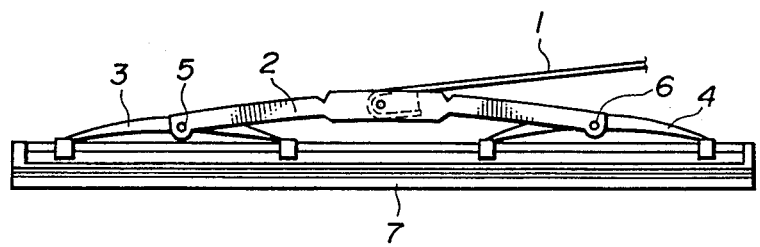

YOKE MEMBER CONNECTING DEVICE IN WINDSHIELD WIPER

DESCRIPTION

1. Field of the Invention

This invention relates to a windshield wiper for use in a vehicle and, particularly to a yoke member connecting device in the windshield wiper.

2. Description of Prior Art

FIG. 12 shows a typical prior art windshield wiper, in which a yoke member 2 is connected to a wiper arm 1 and, is also connected at opposite ends thereof yoke members 3 and 4 respectively through pivot pins 5 and 6 respectively. A wiper blade including a wiping blade or a blade rubber 7 is supported by the yoke members 3 and 4. The pivot pins 5 and 6 are usually rivets, which require troublesome rivetting operation in assembly the wiper.

Japanese Patent Publication No. 55-8371 shows a connecting device for omitting the rivetting operation, however, it is required to bend a yoke member during the assembling operation so that the assembling cost cannot be reduced.

The assignee of the invention has proposed in Japanese Utility Model Application No. 60-91158 a connecting device, in which tapered portions are provided on opposite ends of the pivot pin and, which tapered portions engage respectively with resilient bearing portions so as to prevent the pivot pin from escaping out. However there are problems in the material of resilient bearing portions and in production costs.

SUMMARY OF THE INVENTION

An object of the present invention is to solve the problems aforementioned and to provide a novel yoke member connecting device of a windshield wiper.

According to the invention there is provided a yoke member connecting device for pivotally connecting a first and a second yoke members of a windshield wiper, each of the yoke members having generally channel shaped cross section consisting of vertical side walls and a top wall connecting the upper ends of the side walls respectively, the connecting device comprises a spacer member having opposing side walls engaging with the inside surfaces of the side walls of the first yoke member and with the outside surfaces of the side walls of the second yoke member and a top wall connecting the side walls of the spacer member, and a pivot pin extending through the side walls of the first and second yoke members and of the spacer member, the pivot pin having a shall diameter portion at the location passing through at least one of the side walls of the spacer member. The at least one side wall of the spacer member has a bore corresponding to the small diameter portion of the pivot pin, and a first cutout extending radially outward from the bore in one direction, and the at least one side wall of the spacer member further has a second cutout spaced from the first cutout in the direction generally perpendicular to the first direction, and the second cutout extending generally parallel to the first cutout.

The first and second cutouts enable to resiliently expand the bore, thus, it is possible to pass through the remaining portion or the large diameter portion of the pivot pin, thereby enabling the assembling operation by simply pushing the pivot pin through aligning openings in side walls of first and second yoke members and the spacer member. Further, in assembled condition, the bore in the spacer member engages with the small diameter portion of the pivot pin to reliably maintain the pivot pin in its assembled position.

BRIEF DESCRIPTION OF THE DRAWINGS

Further objects and advantages of the present invention will become apparent from the following description with reference to the drawings exemplifying some preferred embodiments of the present invention, in which:

FIG. 1 is a vertical sectional view of a yoke member connecting device according to a first embodiment of the present invention;

FIG. 2 is an exploded view of the first embodiment;

FIG. 3 is a partial side view showing a spacer member and a pivot pin of the first embodiment;

FIG. 8 is a partial side view of a portion of the embodiment of FIG. 7

FIGS. 9, 10 and 11 are respectively sectional views of pivot pins of modified forms, and FIG. 12 is a schematic view of a typical prior art windshield wiper.

DETAILED DESCRIPTION OF PREFERRED EMBODIMENTS

Figure 4:
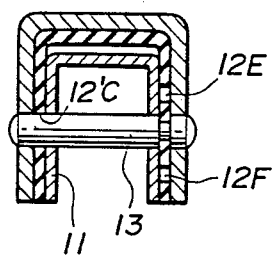
FIG. 4 is a vertical sectional view similar to FIG. 1 but showing a modified form.

FIGS. 1 through 3 show a first embodiment of the invention, in which, shown at 10 is a first yoke member, at 11 a second yoke member, at 12 a spacer member, and at 13 a pivot pin. The yoke members 10 and 11 correspond respectively the yoke members 2 and 3 in FIG. 12, but the invention is not limited to the type shown in FIG. 12 and may be applied to any desired types.

The yoke member 10 has a cross section having generally vertical side walls 10A and 10A and a top wall 10B connecting the upper ends of the side walls. It will be noted that the top and side walls may be connected in any desired manner such as a smooth curve and the like. Similarly, the yoke member 11 has a cross section having generally vertical side walls 11A and 11A and a top wall 11B connecting the upper ends of the side walls.

The spacer member 12 has side walls 12A and 12A engaging respectively with the inner surfaces of the side walls 10A and 10A of the first yoke member 10 and with the outer surfaces of the side walls 11A and 11A of the second yoke member 11, and a top wall 12B connecting the side walls 12A and 12A. In the embodiment, the top wall 12B engages with the inner surface of the top wall 10B of the first yoke member 10 and is spaced from the top wall 11B of the second yoke member 11, but the top wall 12B of the spacer member may have an arcuate projecting portion slidingly engaging with the outer surface of the second yoke member 11. Further, the spacer member may pivotally move together with the second yoke member 11 relative to the first yoke member 10 such that the top wall 12B engages with the outer surface of the top wall 11B of the second yoke member 11 and is spaced from the top wall 10B. The spacer is preferably formed of a synthetic resin material.

There are formed in the side walls 10A and 10A of the first yoke member 10 respectively aligning circular openings 10C and 10C with the diameter of which corresponding to the diameter of the larger diameter portion 13A of the pivot pin 13. The side walls 11A and 11A of the second yoke member 11 having also aligning circular openings 11C and 11C of the same size. There are formed in the pivot pin 13 intermediate small diameter portions 13B and 13B at locations passing through the side walls 12A and 12A of the spacer member 12. The remaining portion of the pivot pin 13 is defined as large diameter portion 13A. The small diameter portion 13B and 13B of the pivot pin 13 engage with openings 12C and 12C in the side walls 12A and 12A of the spacer member 12 respectively.

Further, there are formed in side walls 12A and 12A of the spacer member 12 first cutouts 12D extending in generally horizontal direction from openings 12C and 12C and second cutouts or grooves 12E and 12F which are spaced from the first cutouts 12D in the vertical direction and extend in generally horizontal direction or parallel first cutout 12D.

In assembling, the yoke members 10 and 11 and the spacer member 12 are located at predetermined position such that the openings 10C, 11C and 12C are aligned to each other, and the pivot pin 13 is inserted axially, the bore 12C can be expanded since the upper and the lower walls can be displaced resiliently due to the second cutouts 12E and 12F so that the large diameter portion of the pivot pin 13 can pass through the bore 12C, and when the pivot pin takes assembled position as shown in FIG. 1, the bores 12C and 12C engage respectively the small diameter portions 13B and 13B of the pivot pin 13. Thus, the assembling operation is easy, and the pivot pin is reliably retained in the assembled position.

FIG. 4 shows a second embodiment of the invention, in which the pivot pin has only one small diameter portion 13B, and the spacer member has also one reduced diameter bore 12C and a set of first and second cutouts in one of the side walls 12A. The second embodiment is not advantageous as compared with the first embodiment since the assembling operation is somewhat troublesome due to the direction of the pivot pin.

Figure 5:
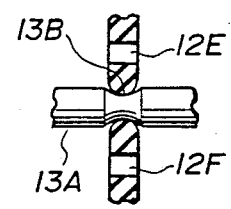
FIG. 5 is a partial sectional view of engaging portion between the pivot pin and the spacer member and showing a modified form.

FIG. 5 is a modified form in which the intermediate small diameter portion 13B of the pivot pin 13 and the bore 12C in the side wall 12A of the spacer member 12 are of rounded configuration.

Figure 6:
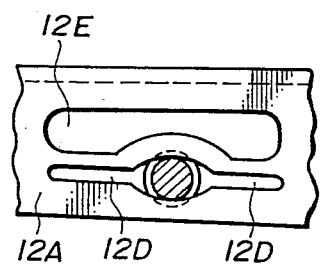
FIG. 6 is a partial side view similar to FIG. 3 but showing a modified form.

FIG. 6 shows an example omitting one of the second cutouts 12E. The lower edge of the side wall 12A resiliently deforms to permit the expansion of the bore 12C in inserting the large diameter portion 13A of the pivot pin 13 therethrough.

Figure 7:
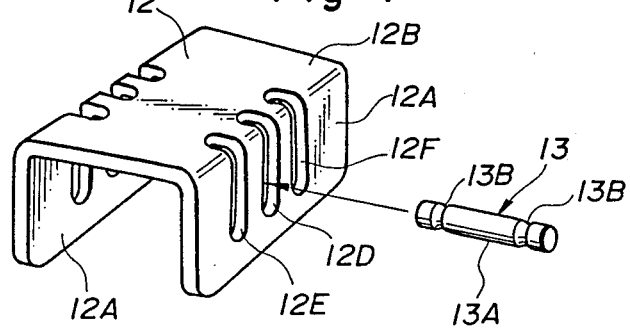
FIG. 7 is an exploded view showing a spacer member and a pivot pin according to another embodiment of the present invention.

FIGS. 7 and 8 show a further embodiment, in which the first and the second cutouts 12D, 12E and 12F are spaced in the horizontal direction and extend respectively in the vertical direction. Further, the upper ends of respective cutouts extend into the top wall 12B of the spacer member 12, respectively. The bore 12C is formed as a part of the first cutout 12D of a uniform width.

FIGS. 9, 10 and 11 show examples of the intermediate small diameter portion 13B. FIG. 9 shows the small diameter portion 13B arranged eccentrically relative to the large diameter portion 13A, FIG. 10 shows an arcuate groove for defining the small diameter portion 13B and FIG. 11 shows a straight groove for defining the small diameter portion. It will be understood that the small diameter portion may have any desired configuration. Further, these embodiments are advantageous in that one of the second cutouts 12E or 12F may be omitted since the large diameter portion 13A and the small diameter portion 13B of the pivot pin 13 overlap with each other at least in one circumferential direction so that it is not required to expand the bore 12C in such direction.

As described heretofore, according to the invention, the yoke members can be connected pivotally by a simple device of the minimum number of parts. The assembling operation is easy and reliable, and enables to omit the rivetting operation.

We claim:

1. A yoke member connecting device for pivotally connecting a first and a second yoke members of a windshield wiper, each of said yoke members having generally channel shaped cross section consisting of vertical side walls and a top wall connecting the upper ends of the side walls respectively, the connecting device comprises a spacer member having opposing side walls engaging with the inside surfaces of the side walls of the first yoke member and with the outside surfaces of the side walls of the second yoke member and a top wall connecting the side walls of the spacer member, and a pivot pin extending through the side walls of the first and second yoke members and of the spacer member, said pivot pin having a small diameter portion at the location passing through at least one of the side walls of the spacer member, said at least one side wall of the spacer member having a bore corresponding to the small diameter portion of the pivot pin, and a first cutout extending radially outward from said bore in one direction, said at least one side wall of the spacer member further having a second cutout spaced from the first cutout in the direction generally perpendicular to the first direction, and said second cutout extending generally parallel to the first cutout.

2. A yoke member connecting device in a windshield wiper according to claim 1, wherein said pivot pin has a small diameter portion at each location passing through each side wall of the spacer member.

3. A yoke member connecting device in a windshield wiper according to claim 1, wherein said first direction is the horizontal direction, and the second cutout is disposed on the upper side of said bore.

4. A yoke member connecting device in a windshield wiper according to claim 3, wherein said second cutout is provided on the upper side and also lower side of said bore.

5. A yoke member connecting device in a windshield wiper according to claim 1, wherein said first cutout extends in the vertical direction, and the second cutout is constituted of two vertically extending cutouts or grooves spaced horizontally from the first cutout and interposing the first cutout therebetween.

6. A yoke member connecting device in a windshield wiper according to claim 1, wherein the intermediate small diameter portion is defined by an annular groove.

7. A yoke member connecting device in a windshield wiper according to claim 1, wherein the intermediate small diameter portion is defined by a groove such as an arcuate groove or eccentric groove which terminates at the outer circumference of the large diameter portion of the pivot pin.

* * * * *